United States Patent
Cripe

(10) Patent No.: US 7,228,247 B1
(45) Date of Patent: Jun. 5, 2007

(54) SENSOR HYSTERESIS REDUCTION

(75) Inventor: David W. Cripe, Williamsburg, VA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 11/270,124

(22) Filed: Nov. 9, 2005

(51) Int. Cl.
G01D 18/00 (2006.01)
G06F 19/00 (2006.01)

(52) U.S. Cl. ..................................... 702/104
(58) Field of Classification Search ............... 702/104
See application file for complete search history.

(56) References Cited

U.S. PATENT DOCUMENTS

| | | | |
|---|---|---|---|
| 4,187,806 A * | 2/1980 | Schnurle et al. | 123/695 |
| 4,280,365 A * | 7/1981 | Connery et al. | 73/861.25 |
| 5,351,555 A | 10/1994 | Garshelis | |
| 5,585,554 A * | 12/1996 | Handfield et al. | 73/146.5 |
| 5,696,575 A | 12/1997 | Kohnen et al. | |
| 5,889,215 A | 3/1999 | Kilmartin et al. | |
| 5,939,881 A | 8/1999 | Slater et al. | |
| 6,145,387 A | 11/2000 | Garshelis | |
| 6,222,363 B1 | 4/2001 | Cripe | |
| 6,298,467 B1 | 10/2001 | Chuang et al. | |
| 6,300,855 B1 | 10/2001 | Clark et al. | |
| 6,346,812 B1 | 2/2002 | May et al. | |
| 6,516,508 B1 | 2/2003 | Gandarillas | |
| 6,553,847 B2 | 4/2003 | Garshelis | |
| 6,698,299 B2 | 3/2004 | Cripe | |
| 2002/0162403 A1 | 11/2002 | Cripe | |
| 2004/0059532 A1 * | 3/2004 | Koenig | 702/104 |

* cited by examiner

Primary Examiner—John Barlow
Assistant Examiner—Cindy D. Khuu

(57) ABSTRACT

A method and circuit includes a means for reducing hysteresis in a system. The method includes the definition of boundary conditions relative to an incoming signal. The boundary conditions and the incoming signal are then utilized to determine a proper correction value. The hysteresis correction value is tailored to changes in the input signals. The modification occurs because the boundary conditions are changed depending on the input signal such that the correction values are constantly and continuously varied and implemented to accommodate changes in the input value. The constant accommodation and changing of the correction value provides a simple and effective hysteretic error accommodation that yields a substantially free hysteresis signal.

14 Claims, 4 Drawing Sheets

SENSOR HYSTERESIS REDUCTION

BACKGROUND OF THE INVENTION

This invention generally relates to a method of reducing hysteresis in a sensor. More particularly, this invention is a method and circuit for providing a resultant signal that is substantially free of hysteresis.

A non-contact sensor for measuring force or torque utilizes magnetoelastic material that generates a magnetic field in response to an applied torque. A force or torque applied to the material causes a temporary deformation in a magnetic field that is measured and correlated to a force or torque. The magnetoelastic material generates a magnetic field in response to the applied force. Changes in the magnetic field of the magnetoelastic materials are measured and utilized to derive and measure the applied force according to a known relationship.

Disadvantageously, the magnetoelastic material may not return to an initial state after the release of an applied force. The shift from the initial state causes a zero shift known as hysteresis. Such a shift in zero point affects the desired accuracy of the sensor assembly.

Accordingly, it is desirable to develop methods for compensating for the affects of hysteresis in a sensor to improve accuracy and reliability.

SUMMARY OF THE INVENTION

An example method and device according to this invention provides for the reduction of hysteresis in the system by modeling the hysteretic output of the sensor system as a sum of a linear function and a hysteretic correction term. The correction term is determined dependent on the sensor output and then is combined with the sensor output to yield a signal that is substantially free of hysteresis.

The method according to this invention includes the step of receiving a hysteresis-bearing signal. The hysteresis-bearing signal is then utilized to determine boundary conditions. The boundary conditions along with the hysteretic bearing signal are utilized to determine a correction signal. The correction signal is then combined with the hysteretic bearing input signal to provide an output composite signal that is substantially without hysteresis.

The method determines boundary conditions with respect to the specific value of the hysteresis-bearing signal. The boundary conditions are modified and changed based on the value of the hysteresis-bearing signal. Modification and change of the boundary conditions accounts for non-linearity in the hysteresis-bearing signal. The boundary conditions are defined and remain stable until such time as the hysteresis-bearing signal moves outside the boundary conditions. Once a hysteresis-bearing signal is received that is outside the boundary conditions, the boundary conditions are redefined to accommodate changes to the corrective hysteresis value and provide a correction factor tailored for the position and value of the hysteresis-bearing signal.

This invention also includes an example hysteresis corrections circuit that corrects a hysteresis-bearing signal. The example hysteresis correction circuit includes a comparator circuit that defines boundary conditions based on the incoming hysteresis-bearing signal. The comparator circuit is coupled to a potentiometer that provides an output that is a correction value. The output of the potentiometer is incremented depending on the value of the comparator circuit. The comparator circuit determines boundary conditions and also provides for incrementing of the potentiometer. The output from the potentiometer provides the correction value that is combined with the hysteresis bearing signal to provide a composite substantially hysteresis free output signal.

If the hysteresis-bearing signal incoming to the comparator circuit is beyond the current boundary conditions, new boundary conditions are defined. When new boundary conditions are defined the potentiometer is incremented to correct and change the correction value that is combined with the hysteresis-bearing signal. In this way, a substantially hysteresis free signal can be obtained throughout an output range of a sensor.

Accordingly, the method and system according to this invention provides for the correction and reduction in hysteresis present in sensor signals.

These and other features of the present invention can be best understood from the following specification and drawings, the following of which is a brief description.

DETAILED DESCRIPTION OF THE PREFERRED EMBODIMENT

Figure 1:
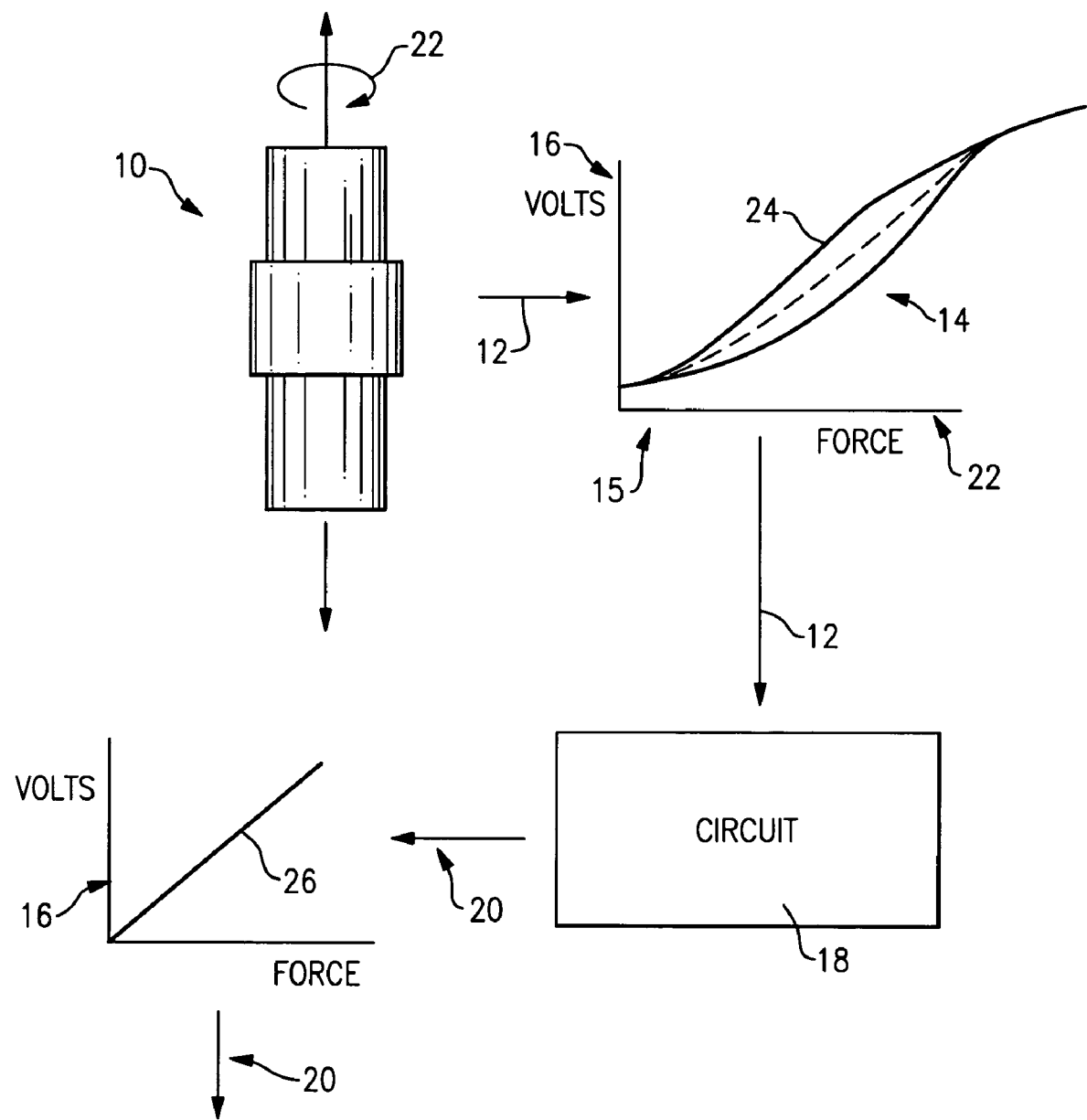
FIG. 1 is a schematic representation of the method and system according to this invention.

Referring to FIG. 1, a sensor assembly 10 is shown schematically that generates a signal 12 that includes hysteresis. The signal 12 is schematically illustrated by way of graph 15. The graph 15 relates a force 22 to a voltage 16. The example sensor assembly 10 is a torque sensor that generates a magnetic field in response to an applied torque. The magnetic field in turn is converted into a voltage signal indicative of the applied force. The voltage signal is then used by various other systems as is desired. The signal emitted from the sensor assembly includes a hysteretic portion meaning that the signal 12 does not retrace itself.

In both mechanical and magnetic systems an applied force when removed does not always result in a return to an initial state. A curve indicative of a magnetic field generated responsive to an applied torque therefore does not always retrace itself. The method according to this invention processes a hysteresis-bearing signal 12 with a hysteresis correction circuit 18 to provide a composite signal 20 having a more linear relationship 26 between applied force 22 and an output voltage signal 16.

As is appreciated, the example illustrated and discussed is that of a torque sensor that provides an output that is translated into a voltage signal. Although the torque sensor is illustrated and discussed by way of example other sensors as are known in the art will also benefit from the disclosure of this invention.

Figure 2:
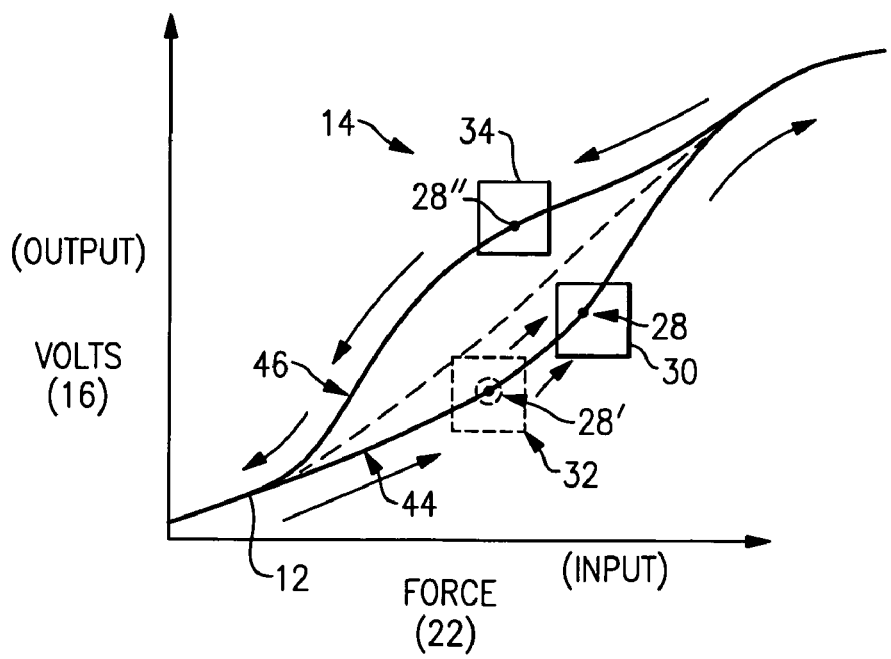
FIG. 2 is a graphical representation of an example hysteresis-bearing signal and example boundary conditions applied to the hysteresis-bearing signal.

Referring to FIG. 2, the hysteresis-bearing signal 12 is schematically illustrated and includes an outgoing portion 44 that is indicative of the application of a torque or other force and an incoming portion 46 indicative of a release of force on the sensor assembly 10. The relationship between input applied force and output voltage of the sensor differ depending on whether force is being applied or released as is shown by the gap between line 44 representing application of force and the line 46 representing the release of a force.

The method according to this invention includes the receipt of an input signal of a specific magnitude for a given force as indicated at 28. The input signal 28 is utilized to determine boundary conditions 30 disposed about the input signal 28. The boundary 30 is determined relative to the signal 28. Accordingly, the boundary 30 and the input signal 28 are utilized to determine a correction signal. Within the boundary 30, a correction signal is applied to produce a composite signal that is substantially free of hysteresis.

The boundary 30 defined around the input signal 28 is maintained until such time as the input signal 28 exceeds the boundary limits. At such time new boundary conditions are defined for the new signal. A new boundary 32 is disposed around an input signal 28'. As the input signal 28 changes and new values are received the boundaries 30 change. Further, additional boundary conditions are defined relative to each new received input signal. In this instance, the new input signal 28" is received and a new boundary condition 34 is defined around that new input condition 28'.

Each time the input signal 28 exceeds the existing boundary values, a new set of boundary values are determined and utilized to determine a new correction factor that is combined with the new hysteresis signal to provide a substantially hysteresis free output for use with the system.

Figure 3:
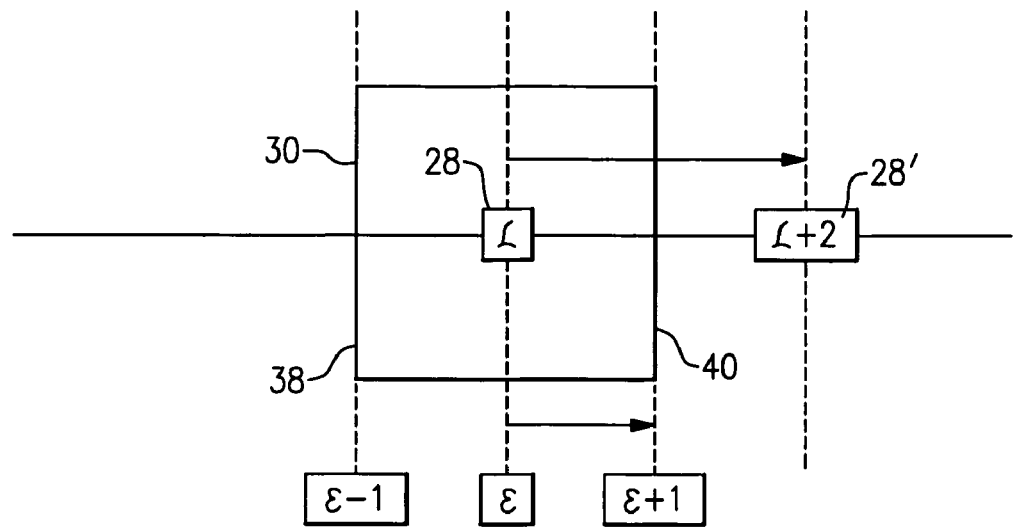
FIG. 3 is a graphical representation of the boundary conditions surrounding the hysteresis-bearing signal.

Referring to FIG. 3, changing of the boundary conditions is illustrated schematically where the signal 28 is disposed substantially within a symmetrically disposed boundary 30. The symmetrically disposed boundary 30 includes an upper limit 40 and a lower limit 38. If the signal 28 remains within the boundary conditions 30, no changes are made to the correction factor. The boundary conditions remain the same no matter where the input signal is as long as it is within the upper and lower boundary conditions 38 and 40. The relationship between the input signal 28 and the boundary conditions 38 are incremented according to the following relationship for changes in the input signal.

where if $(\epsilon-1)<\sigma<(\epsilon-1), \epsilon$ does not change where $\epsilon$ is a boundary value and $\sigma$ is the input signal.

Accordingly, the boundary conditions are modified according to the following relationships:

If $\sigma$ is increasing to the point at which $\sigma=(++1), \epsilon$ is increased as necessary so as to keep $\epsilon=(\sigma-1)$ If $\sigma$ is decreasing to the point at which $\sigma=(\epsilon-1), \epsilon$ is decreased as necessary so as to keep $\epsilon=(\sigma+1)$ The boundary conditions are then utilized and combined along with the input signal to determine the proper hysteretic correction value. An example generalized expression for a function approximating a hysteretic function is as follows:

$$E(\sigma)=a_0 \cdot \sigma + \Sigma a_n \cdot \epsilon(b_n \cdot \sigma), n=1, 2, \ldots$$

Figure 4:
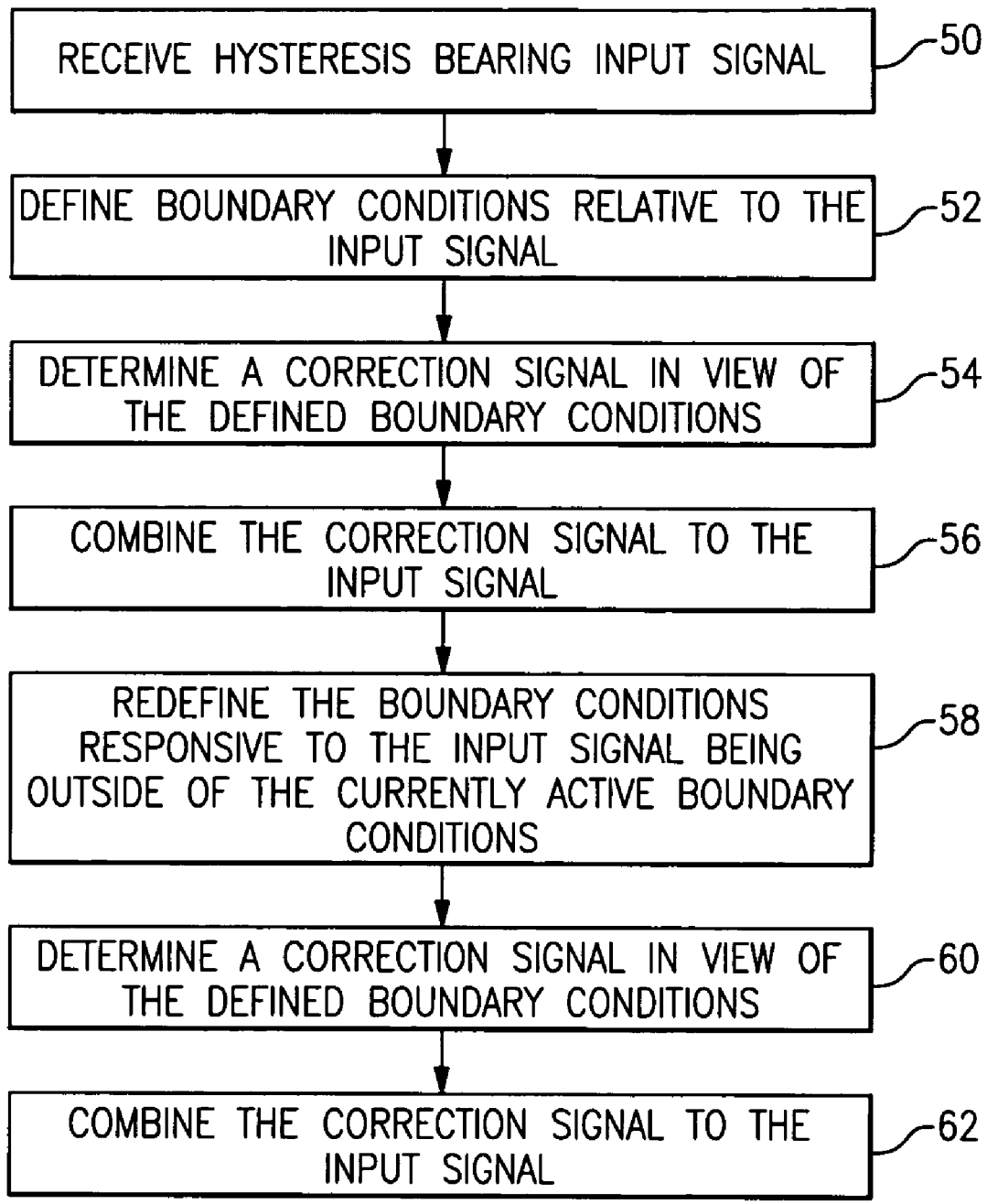
FIG. 4 is a block diagram illustrating the method steps of this invention.

Referring to FIG. 4, a block diagram illustrating the method steps for reducing hysteresis according to this invention includes the initial step of receiving a hysteresis bearing input signal as indicated at 50. The input signal is then utilized to define the boundary conditions as indicated 52. The boundary conditions remain unchanged until such time as the input signal exceeds the initially set boundary conditions. With the boundary conditions set as is indicated at 52; a correction signal is determined based on the input signal and the defined boundary conditions as is indicated at 54. The correction signal and input signal are combined as shown at 56 to provide a composite output substantially free of hysteresis. This step is repeated each time the input signal exceeds the currently set boundary conditions as indicated at 58.

Once the input signal exceeds the currently defined boundary conditions, the boundary conditions are redefined to provide a new set of variables utilized to determine a correction factor as is indicated at 60. The correction factor is then combined with the hysteresis bearing input to provide a corrected substantially hysteresis free composite signal as indicated at 62.

Figure 5:
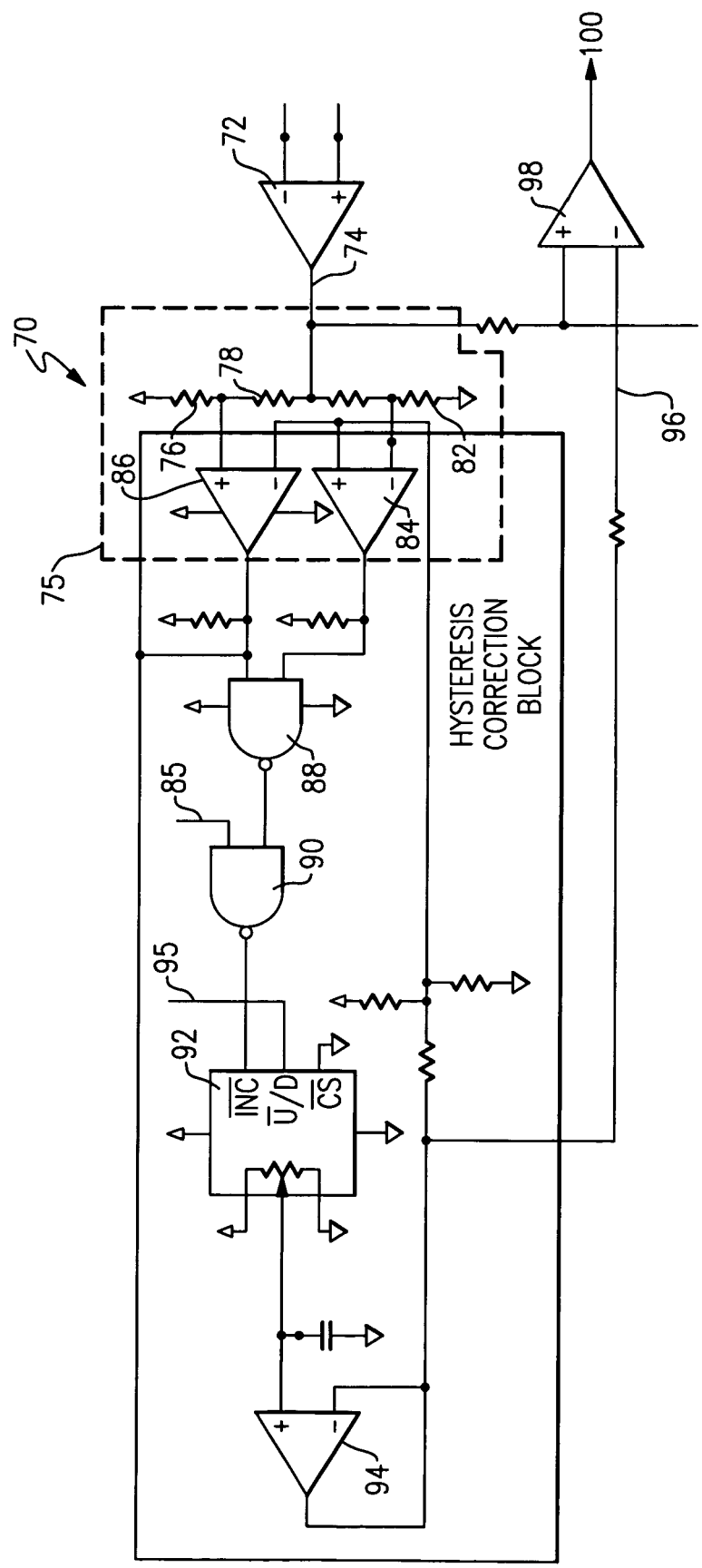
FIG. 5 is a circuit diagram of an example hysteresis correction circuit according to this invention.

Referring to FIG. 5, a circuit for correction of a hysteresis-bearing signal is generally indicated at 70 and generates the correction signal based on boundary conditions tailored to the hysteresis-bearing signal. The correction factor is then utilized and combined with the original signal to minimize hysteresis error.

The circuit 70 is provided with an input 74 from op amp 72. The input 74 is a hysteresis-bearing signal and is input into a comparator circuit 75. The comparator circuit includes a first comparator 86, a second comparator 84 and resistors 76, 78, 80, 82. The comparator circuit 75 serves to position the comparators voltage window symmetrically around the input signal 74. The voltage signal acts as the boundary conditions. The comparator circuit 75 outputs a signal that is combined and utilized by a digital potentiometer 92. The digital potentiometer 92 provides a feedback signal to the comparator circuit 75. If the voltage input into the comparator circuit 75 exceeds the voltage window, the comparator circuit 75 will move to a higher or lower state depending on the direction in which the input signal 74 is different than the comparator voltage window. The comparator circuit 75 will then cause an incremental change in voltage emitted by the digital potentiometer 92, thus causing a change in the correction factor to the input signal 74.

The output from the potentiometer is then combined with the input signal 74 in op amp 98 to provide a composite signal 100. The composite signal 100 is substantially error free due to the combination of the voltage correction factor provided by the digital potentiometer 92.

In operation an incoming hysteresis-bearing signal 74 is received by the comparator circuit 75. If the input signal 74 is within the voltage window defined by the comparator circuit 75 no change is made to the digital potentiometer 92. A voltage or correction factor that is provided by the digital potentiometer is then combined with the input signal at the op amp 98 to provide the composite signal 100.

If the incoming signal 74 is outside of the voltage window provided by the comparator circuit 75, the potentiometer 92 will increment either to increase or decrease the feedback signal. The change in the feedback signal provides for a change in correction signals combined with the originally input signal 74. The correction signals 94 goes through a second op amp 94 and then proceeds as a correction signal as indicated generally at 96 and then combined in the top amp 98 with the original input hysteresis bearing signal 74 to provide and yield a composite signal 100 that is substantially free of hysteresis.

A sensor system is discussed and illustrated as an example embodiment other sensors as are known in the art will benefit from the disclosures of this invention. Further, the method and system according to this invention provides for the substantial reduction of hysteresis in the hysteresis bearing devices with a simple circuit that is implemental in a feed forward fashion to increase accuracy and yield a substantially hysteresis free signal.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of reducing hysteresis in a sensor device, said method comprising the steps of:
   (a) receiving an input signal from the sensing device;
   (b) determining boundary values about the input signal;
   (c) determining a correction signal based on the boundary values and the input signal;
   (d) combining the correction signal with the input signal yielding a composite signal, wherein the composite signal is indicative of a signal of the sensor device substantially without hysteresis; and
   (e) outputting the composite signal for use by a system.

2. The method as recited in claim 1, including maintaining the determined boundary values about the input signal responsive to the input signal remaining within a range of the boundary values.

3. The method as recited in claim 1, including redefining the boundary values responsive to the input signal being a value outside of a range of the boundary values.

4. The method as recited in claim 3, including determining the correction signal based on the redefined boundary values.

5. The method as recited in claim 1, including determining the correction signal based on previous input signals.

6. The method as recited in claim 1, including retaining previous input signal values within the determined boundary values.

7. A hysteresis correction circuit assembly for correcting a hysteresis containing signal comprising:
   a comparator circuit that defines boundary conditions based on an incoming hysteresis bearing signal;
   a potentiometer providing an output correction value, wherein said correction value is selected responsive to a value of said hysteresis bearing signal; and
   an amplifier that combines said hysteretic bearing signal with the selected correction value to yield a composite signal.

8. The assembly as recited in claim 7, wherein said comparator is coupled to the potentiometer such that upon receipt of a hysteretic bearing signal outside of the defined boundary conditions causes an incremental change in said output correction value.

9. The assembly as recited in claim 7, wherein the comparator circuit comprises a first comparator, a second comparator and a first, second, third and forth resistors in series with a corresponding one of said first and second comparators.

10. The assembly as recited in claim 9, wherein one of said first and second comparators increments a logic state responsive to said hysteresis-bearing signal being outside the defined boundary conditions.

11. The assembly as recited in claim 7, wherein the hysteretic bearing signal comprises an input voltage, and said comparator circuit defines a voltage window symmetric about said input voltage.

12. The assembly as recited in claim 11, wherein said correction value comprises a correction voltage, and said correction voltage is incremented responsive to said input voltage being outside of the boundary conditions.

13. The assembly as recited in claim 12, wherein said correction voltage is combined with the input voltage to yield said composite signal.

14. The assembly as recited in claim 13, wherein said correction voltage is subtracted from said input voltage to yield said composite signal.

* * * * *